United States Patent [19]

Sabo

[11] Patent Number: 4,883,279

[45] Date of Patent: Nov. 28, 1989

[54] SEALING SYSTEM

[76] Inventor: Robert C. Sabo, 291 Indian Paintbrush #3, Casper, Wyo. 82604

[21] Appl. No.: 93,770

[22] Filed: Sep. 8, 1987

[51] Int. Cl.$^4$ .................. F16J 15/18; B65Q 53/00
[52] U.S. Cl. ........................................ 277/1; 277/228
[58] Field of Search ............................ 277/1, 228, 152; 24/16 R, 17 B, 3 K, 3 A, 31; 138/155, 120; 285/397, 911, 914; 43/18.1

[56] References Cited

U.S. PATENT DOCUMENTS

| | | | |
|---|---|---|---|
| 1,524,590 | 1/1925 | Stanley | 43/18.1 |
| 2,200,102 | 5/1940 | Sepe | 24/17 B X |
| 2,538,306 | 1/1951 | Fox et al. | 43/18.1 |
| 2,573,132 | 10/1951 | French | 24/3 A X |
| 3,058,680 | 10/1962 | Peterson et al. | 24/31 C X |
| 3,218,211 | 11/1965 | Taylor et al. | 277/152 X |
| 3,221,746 | 12/1965 | Noble | 285/397 |
| 3,254,443 | 6/1966 | Olson | 24/31 C X |
| 3,562,871 | 2/1971 | Peterson | 24/31 C |
| 3,660,192 | 5/1972 | Smith et al. | 277/228 X |
| 4,067,339 | 1/1978 | Chiulli | 24/31 C X |
| 4,635,944 | 1/1987 | Sabo | 277/1 |
| 4,707,518 | 11/1987 | Shah | 525/122 |

Primary Examiner—Donald A. Griffin
Attorney, Agent, or Firm—Dean P. Edmundson

[57] ABSTRACT

A sealing system is described for application around a rotatable shaft extending outwardly from a bearing housing. The sealing system includes (a) a flexible sealing member having a longitudinal interior cavity, (b) a flexible connecting member having a diameter approximately equal to the diameter of the cavity in the sealing member. The sealing member is wrapped around the shaft and the connecting member is inserted into and adhered to the ends of the sealing member. Adhesive is used to secure the sealing member to the bearing housing around the shaft.

16 Claims, 2 Drawing Sheets

SEALING SYSTEM

FIELD OF THE INVENTION

This invention relates to techniques for sealing bearing housings. More particularly, this invention relates to techniques for sealing around a rotatable shaft extending outwardly from a bearing housing.

BACKGROUND OF THE INVENTION

Wherever rotating shafts are present in machinery and other such equipment it is necessary to support the shafts by means of a bearing in a housing. The bearings typically used are roller bearings or ball bearings, for example. With either type of bearing it is necessary to maintain sufficient lubricant therein to minimize wear of the bearing and the shaft and to prevent seizing of the shaft within the bearing. For this reason a seal is used at the outside edge of the bearing housing to prevent loss of lubricant.

Not uncommonly the seal in the bearing fails. This may be due to a number of reasons but the result is that the lubricant is permitted to escape from the bearing. Unless this problem is corrected in a timely manner the bearing may be ruined, the shaft may become scored, and the reminder of the machine or the equipment supported by the shaft may become damaged.

Conventionally the failed or inoperative seal is removed entirely and replaced with a new seal. However, this procedure requires disassembly of at least a portion of the machine or equipment. Of course, this necessarily involves a great amount of time and expense. When the equipment or machine is very large the repair procedure will also require the use of large and high capacity tools such as hoists, cranes, etc. in order to lift and move certain portions of the machine which must be disassembled before the seal may be removed.

For example, when the equipment which must be repaired is an oil well pumping unit, the shafts are several inches in diameter and the crank arms supported on such shafts are several feet long and weigh hundreds or thousands of pounds. Accordingly, in order to replace failed seals in such a unit the repair process is very time-consuming and is very costly. Furthermore, heavy equipment is required to handle the disassembled components. Moreover, the lost production time can result in a considerable loss until the repairs are completed and the unit is placed back in service. There are many other types of machinery and equipment in use in various types of industries which present similar problems when seals fail.

Seals may also fail because of over-greasing. Pressure from a grease gun can push normal seals out.

Although there has been suggested one type of split seal which may be installed around a shaft, use of such seal does not overcome all of the problems normally encountered nor is it suitable for all applications. Such seal is available from Garlock under the tradename "Split Klozure" and is U-shaped in cross-section. A plurality of metal fingers molded into the rubber seal body maintain the desired U-shape. After the seal has been fitted over the shaft a separate cover plate assembly must be made which is then bolted onto the bearing housing to firmly secure the seal in the desired position. This requires that sufficient space be available in front of the face of the bearing housing to enable the use of drills, etc. to form and then thread the requisite holes in the bearing housing. It is also necessary to make a suitable cover plate for each installation.

Of course, there is not always sufficient available space at the seal location to enable holes to be drilled and threaded, for example. Nor is there always sufficient space to accommodate the required cover plate. Moreover, the Garlock seal does not have the capability to accommodate shafts of many different sizes. Rather, only minor variations in shaft sizes can be accommodated by an individual seal.

My prior U.S. Pat. No. 4,635,944 described a strip type of seal which can be wrapped around a shaft extending outwardly from a bearing housing. The ends of the strip are cut at a slant and overlap each other. One surface of the seal is flat and it is adhered to the outer surface of the bearing housing.

The present invention provides a seal design and sealing technique which overcomes the disadvantages of the Garlock seals and which is even easier to use than my prior seal design.

SUMMARY OF THE PRESENT INVENTION

In accordance with the present invention there is provided a sealing system comprising (a) a length of flexible sealing material having a longitudinal interior cavity therein, (b) a length of flexible connecting material having a diameter approximately equal to the inside diameter of the cavity in the sealing material, and (c) adhesive for adhering the connecting material to the sealing material and for adhering the sealing material to the bearing housing around the shaft.

The sealing material is wrapped around the rotatable shaft and then cut to a length such that the two ends can be brought into contact when the sealing material is under slight tension. Then a short section of the connecting material having two ends is inserted into the cavities at the respective ends of the sealing material. The connector makes a perfect alignment for the ends of the sealing material. The ends of the connecting material are adhered in the cavities in the ends of the sealing material.

The side of the sealing material next to the bearing housing is then adhered to the bearing housing (e.g. with epoxy adhesive). The connecting material is adhered in the cavities at the abutting ends of the sealing material to form a unitary seal construction.

The sealing material is preferably made of an elastic material such as rubber. The cross-sectional shape may also vary. A preferred cross-section is circular. The interior cavity may also vary in cross-sectional shape.

The connecting material is also preferably elastic and may have various cross-sectional configurations. A preferred shape is circular.

The seal of this invention can be installed without costly and time-consuming disassembly of the components of the machinery or equipment being repaired. Furthermore, there is no need for drilling holes or using cover plates to hold the seal in place. Morover, the seal may be applied even in situations where there is very limited space to work in. The installation is not time-consuming or costly and does not require expensive or cumbersome tools or equipment. One person can complete the installation in a matter of minutes.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
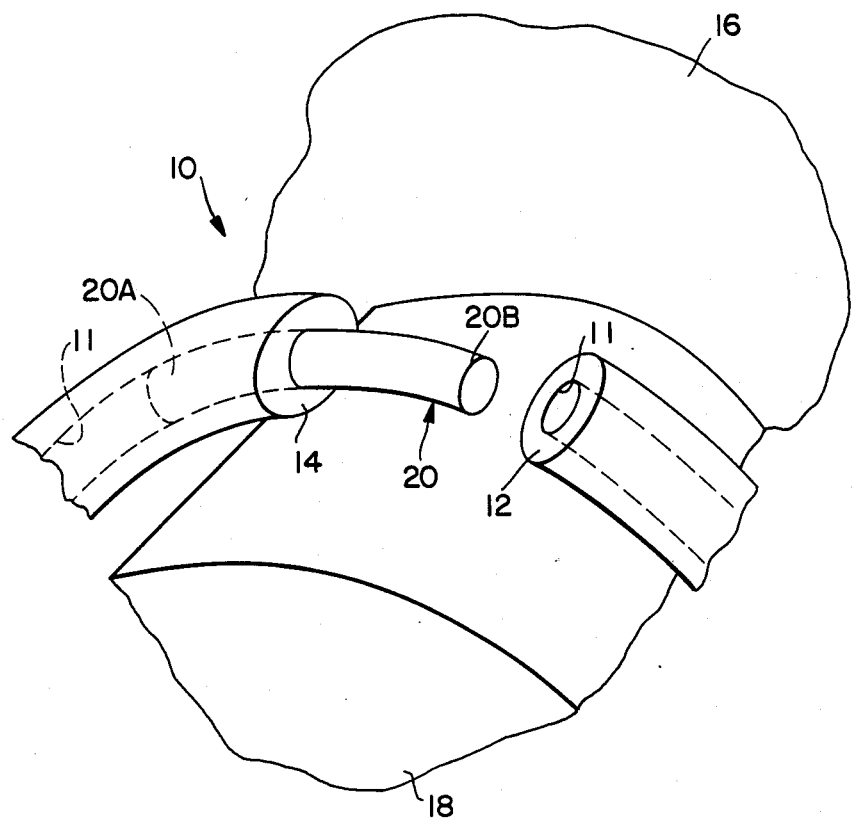
FIG. 1 is a perspective view illustrating the application of a seal of this invention.

Thus, in the drawings there is shown a preferred embodiment of seal 10 of this invention. The seal comprises an elongated strip having two terminal ends 12 and 14. The strip is flexible, preferably elastic, and has a length greater than its width. It can be applied around a shaft without disassembly of the machinery in which the shaft is located.

FIG. 1 is a partial view showing the preferred manner in which the two ends of the sealing material can be secured together around a shaft by means of a length of connecting material 20 having ends 20A and 20B. The sealing material includes a longitudinal cavity 11 which extends through the interior of the sealing material. The one end 20A of the connector 20 is slidably inserted into the interior cavity at end 14 of the sealing material, and end 20B is adapted to be slidably inserted into the cavity at end 12 of the sealing material after the sealing material has encircled the rotatable shaft 18 adjacent the outer surface 16 of a bearing housing.

Figure 2:
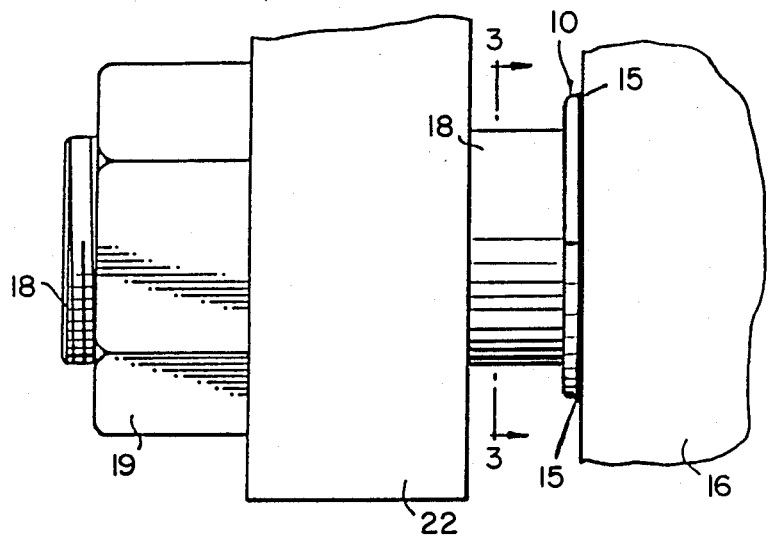
FIG. 2 is a side view showing a seal of the invention installed on a rotatable shaft between a bearing housing and a crank arm.
Figure 3:
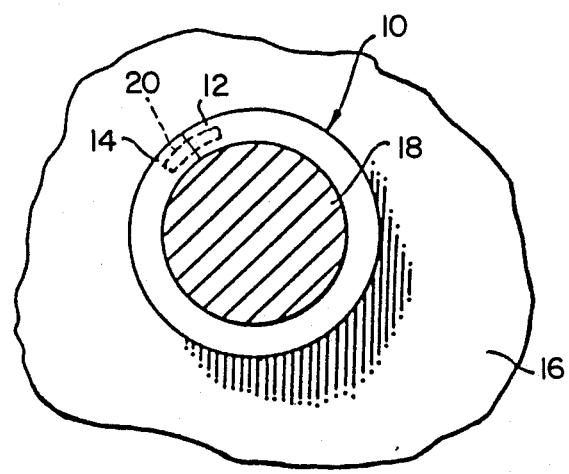
FIG. 3 is an elevational view along line 3—3 in FIG. 2.

The connector member 20 is adhesively secured in cavity 11 at each end of the sealing material when the seal is applied or installed around the shaft, i.e., adhesive is applied to each end of the connecting material before being inserted into the cavity in the sealing material. The ends of the sealing material are also adhesively secured together. Then the seal is adhesively secured to the outer surface 16 of the bearing housing, as illustrated in FIG. 2 where the adhesive is designated as 15. Preferably the adhesive extends along the length of the seal around the entire circumference of the seal and approximately half way over the seal. FIG. 2 also illustrates crank arm 22 secured on shaft 18 by means of nut 19.

It is also preferable for the sealing material to be stretched slightly when it is applied around the shaft so that it is under slight tension when it is adhesively secured in place. This assists in forming a good seal around the surface of the shaft so that lubricant from the bearing housing cannot leak between the seal and the shaft. The completed sealing construction is double-acting, i.e., it prevents fluids from leaking out from the bearing housing and also prevents ingress of foreign materials.

The sealing material is composed of a material which is flexible and preferably oil and moisture-resistant, weather-resistant, and corrosion-resistant. The material should also be crack-resistant at temperatures in the range of about −50° F. to 150° F. The sealing material is preferably elastomeric, e.g. natural or synthetic rubber (such as silicone rubber or a fluoroelastomer or any other type of durable, flexible rubber or elastomer).

The cross-sectional configuration of the sealing material may vary. A preferred cross-sectional configuration is circular, although it may also be ovular, square, rectangular, etc. The diameter of the sealing material may vary, e.g., from about 0.06 inch up to several inches. Commonly used diameters are in the range of about 0.06 to 0.75 inch. The diameter should be uniform along the length of the sealing material.

The interior cavity in the sealing material preferably extends longitudinally through the entire length of the sealing material. The cross-sectional configuration of the cavity is preferably circular, although it may have other configurations instead, e.g. square, ovular, rectangular, etc. The diameter of the cavity may also vary, depending upon the diameter of the sealing material. For example, the diameter of the cavity may be in the range of about 1 mm. to several inches, depending upon the diameter of the sealing material.

The connecting material is flexible and preferably is composed of the same types of materials as described above for the sealing material. The length of the connecting member used to align and secure the ends of the sealing strip together may vary. Generally speaking, the connecting member should be slidably received in each end of the sealing strip at least about ⅛ inch (and preferably at least about ¼ inch) for best results. By increasing the length of the connecting member which is inserted into each end of the sealing strip, the strength of the final seal is also increased. The connecting material causes the abutting ends of the sealing material to be perfectly aligned.

The sealing material and the connecting material may each be provided in continuous lengths (e.g. on separate rolls). Then when it is desired to seal around a shaft, the materials can be cut to the desired length at the job site. The sealing material is preferably stretched slightly when it is cut so that the final seal will be under slight tension when its two ends are joined together. This assists in preventing leakage of lubricant out from the bearing housing along the shaft and also prevents foreign material from entering the bearing housing. Generally speaking, when installing the sealing system of this invention around slowly rotating shafts (e.g., less than 300 rpm) more tension should be used in the seal than when installing the sealing system around faster rotating shafts.

The side of the seal adjacent the bearing housing is adhered to the surface of the bearing housing to secure the seal in place. The surface of the bearing housing should first be thoroughly cleaned so that the adhesive will remain firmly adhered thereto.

The adhesive which may be used herein may be a one-part, two-part, or other multi-part curable adhesive. For example, it may even be an anaerobic adhesive or a pressure-sensitive adhesive. It may also comprise two components, one of which is applied to the face of the seal and the other of which is applied to the face of the housing. When a pressure-sensitive adhesive is used it may be applied to one face of the seal and then covered with a removable protective liner until the time of installation.

A preferred type of adhesive used to secure the seal to the surface of the bearing housing is a conventional two-part epoxy. Cyanoacrylate adhesives may also be used, as can other conventional thermosetting adhesives.

As explained above, each end of the connector member is adhesively secured in the cavity in the sealing material by means of adhesive also. The types of adhesives used for this purpose may be the same or different as those used to secure the seal to the bearing housing.

It has also been found to be helpful to place or apply a small amount of oil or grease around the shaft next to the bearing housing where the sealing system of this invention is installed in order to reduce friction when starting up the repaired equipment after the sealing system has been installed.

Other variants of the invention are possible without departing from the scope of the present invention.

What is claimed is:

1. A method for providing a seal around a rotatable shaft extending outwardly from a bearing housing to prevent leakage of fluid from said bearing housing; said method comprising the steps of:
    (a) extending a length of hollow flexible sealing material around said shaft adjacent said housing; wherein said sealing material includes a longitudinal interior cavity therein extending throughout the length thereof;
    (b) cutting said sealing material to a length not exceeding the circumference of said shaft; wherein said sealing material includes first and second ends;
    (c) providing a length of solid substantially arcuate flexible connecting material having a uniform diameter approximately equal to the diameter of said cavity in said sealing material; said connecting material including first and second ends;
    (d) inserting said first end of said connecting material into said cavity in said first end of said sealing material and adhesively securing said connecting material in said cavity;
    (e) inserting said second end of said connecting material into said cavity in said second end of said sealing material and adhesively securing said connecting material in said cavity;
    (f) urging said first and second ends of said sealing material together uniform; and
    (g) adhesively adhering said sealing material to said bearing housing completely around said shaft.

2. A method in accordance with claim 1, wherein said sealing material is cut to a length such that the sealing material is stretched slightly in order for its first and second ends to abut together.

3. A method in accordance with claim 1, wherein said sealing material has a circular cross-section.

4. A method in accordance with claim 1, wherein said cavity has a circular cross-section and said connecting material has a circular cross-section 5. A method in accordance with claim 1, wherein said connecting material is inserted into said first and second ends of said sealing material at least about 0.25 inch.

6. A method in accordance with claim 1, wherein said sealing material is adhered to said bearing housing by means of epoxy adhesive.

7. A sealing system for application around a rotatable shaft extending outwardly from a bearing housing, said system comprising:
    (a) a length of hollow flexible tubular sealing material having a longitudinal interior cavity therein;
    (b) a length of solid flexible substantially arcuate connecting material having a uniform diameter approximately equal to the diameter of said cavity in said sealing material; said connecting material being adapted to be inserted into said cavity in a manner such that abutting ends of said sealing material are aligned by said connecting material; and
    (c) adhesive on said connecting material and on said sealing material for adhering said connecting material in said cavity of said sealing material and for adhering said sealing material to said bearing housing completely around said shaft.

8. A sealing system in accordance with claim 7, wherein said sealing material has a circular cross-section.

9. A sealing system in accordance with claim 7, wherein said cavity and said connecting material each have a circular cross-section.

10. A sealing system in accordance with claim 7, wherein said sealing material has a diameter in the range of about 0.06 to 0.75 inch.

11. A sealing system in accordance with claim 7, wherein said adhesive comprises epoxy.

12. A sealed bearing system comprising a bearing housing having a rotatable shaft extending outwardly from said housing, said system further including adhesive and:
    (a) a hollow flexible tubular sealing member having a longitudinal interior cavity therein; wherein said sealing member has first and second ends; and
    (b) a solid flexible substantially arcuate connecting member having a diameter approximately equal to the diameter of said cavity in said sealing member; said connecting member having first and second ends and adhesive secured to said sealing member and to said connecting member;

wherein said first end of said connecting member is slidably received in and adhered by said adhesive to said first end of said sealing member, and said second end of said connecting member is inserted into and adhered by said adhesive to said second end of said sealing member; wherein said first and second ends of said sealing member are abutted together in a manner such that said sealing member is under tension around said shaft; and wherein said sealing member is by said adhesive to said bearing housing.

13. A system is accordance with claim 12, wherein said sealing member has a circular cross-section.

14. A system in accordance with claim 12, wherein said cavity and said connecting member each have a circular cross-section.

15. A system in accordance with claim 12, wherein said sealing member has a diameter in the range of about 0.06 to 0.75 inch.

16. A system in accordance with claim 12, wherein said sealing member is adhered to said bearing housing by means of epoxy adhesive.

* * * * *